United States Patent
Schuurman et al.

(12)

(10) Patent No.: US 6,358,435 B1
(45) Date of Patent: Mar. 19, 2002

(54) PHLEGMATIZATION OF CYCLIC KETONE PEROXIDES

(75) Inventors: Pieter Schuurman, Barneveld; Bernhard DeVries, Nunspeet; Willem Koelewijn, Zwolle; Johannes Jacobus De Groot, Gorssel, all of (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/807,356

(22) PCT Filed: Oct. 7, 1999

(86) PCT No.: PCT/EP99/07767

§ 371 Date: May 29, 2001

§ 102(e) Date: May 29, 2001

(87) PCT Pub. No.: WO00/23434

PCT Pub. Date: Apr. 27, 2000

(30) Foreign Application Priority Data

Oct. 16, 1998 (EP) ............................................. 98203483

(51) Int. Cl.[7] ............................ C01B 15/10; C01B 3/00; C08F 7/34; C08F 4/36; C08C 19/04
(52) U.S. Cl. ............................ 252/186.26; 252/186.42; 252/182.13; 252/182.23; 252/182.29; 526/227; 526/228; 525/256; 525/387
(58) Field of Search .................. 252/186.26, 186.42, 252/182.23, 182.29, 182.13; 526/227, 228; 525/256, 387

(56) References Cited

U.S. PATENT DOCUMENTS

| 3,649,546 | A | | 3/1972 | McCloskey et al. |
| 3,649,548 | A | | 3/1972 | McCloskey et al. |
| 3,833,491 | A | * | 9/1974 | Kennedy |
| 3,925,417 | A | * | 12/1975 | Story et al. |
| 4,233,462 | A | * | 11/1980 | Cubbon et al. ............. 568/564 |
| 5,808,110 | A | * | 9/1998 | Torenbeek et al. .......... 549/352 |
| 5,907,022 | A | * | 5/1999 | Stigter et al. ............... 526/228 |
| 5,932,660 | A | * | 8/1999 | Meijer et al. ............... 525/256 |

FOREIGN PATENT DOCUMENTS

| FR | 862974 | | 3/1941 | |
| WO | 93 25615 | | 12/1993 | ............ C08K/5/14 |
| WO | 96 03397 | | 2/1996 | ......... C07D/323/00 |
| WO | WO 96/03444 | * | 2/1996 | |
| WO | WO 96/27620 | * | 6/1996 | |
| WO | 98 33770 | | 8/1998 | ......... C07C/409/00 |
| WO | WO 00/23434 | * | 4/2000 | |

* cited by examiner

Primary Examiner—Joseph D. Anthony
(74) Attorney, Agent, or Firm—Richard P. Fennelly

(57) ABSTRACT

The present invention relates to a composition comprising cyclic ketone peroxide and a phlegmatizer having a 95% boil-off point falling in the range of 220–265° C., most preferably 235–250° C. A preferred peroxide is cyclic methyl ethyl ketone peroxide. Preferably, a single phlegmatizer is used. Preferred phlegmatizers are Isopar® M and Soltrol® 170. The invention also pertains to the use of compositions according to this invention in (co) polymerization and polymer modification processes.

11 Claims, No Drawings

PHLEGMATIZATION OF CYCLIC KETONE PEROXIDES

The present invention relates to a composition comprising cyclic ketone peroxide and phlegmatizer. It also pertains to the use of such a composition in (co)polymerization and polymer modification processes.

Numerous peroxides are known that need to be phlegmatized with an inert diluent or solvent in order to permit their safe handling and use. Cyclic ketone peroxides form no exception. In the context of the present invention, these diluents and solvents are also referred to as phlegmatizers. A phlegmatizer can be a single compound or a mixture of compounds. Cyclic ketone peroxides are useful in, for example, radical (co)polymerization and polymer modification processes. Cyclic ketone peroxides have dimeric, trimeric, tetrameric or higher oligomeric structures.

Conventional cyclic ketone peroxides which meet all safety regulations and can be stored, shipped, and handled in an acceptable, safe fashion have a low content of active oxygen. However, such formulations with low peroxide contents are undesirable, since their use in polymerization and/or polymer modification processes will lead to high levels of undesired inert diluent or solvent residues in the resulting polymeric product and will add to the costs of transport and manufacturing.

Applicant's earlier patent application WO 98/33770 discloses formulations of peroxides in a mixture of at least two phlegmatizers that have boiling points more than 20° C. apart. In Examples 1–3 of WO 98/33770, formulations of cyclic methyl ethyl ketone peroxide in mixtures of Primol® 352 (95% boil-off point 477° C.) and isododecane (boiling point, i.e. bp, 185° C.) are described which have an active oxygen content of 6 weight percent. Cyclic ketone peroxide formulations having a higher active oxygen content are not disclosed or suggested therein.

Whereas the cyclic ketone peroxide formulations of WO 98/33770 have acceptable safety properties, the active oxygen content is still relatively low. Furthermore, the use of two different phlegmatizers is unattractive with respect to handling and the required registration of dual phlegmatizer compositions. Another disadvantage is that the use of low-boiling phlegmatizers is undesired in many applications in respect of the volatile organic compound content in the end product.

In Comparative Examples A and B of WO 98/33770 it is shown that the single phlegmatizer cyclic ketone peroxide formulations in either Primol® 352 or isododecane are not safe. Moreover, the active oxygen content of 6 weight percent is undesirably low. Thus, there remains a need in the art for new cyclic ketone peroxide formulations.

Incidentally, formulations of cyclic ketone peroxides in a single phlegmatizer are further known from applicant's earlier patent application WO 96/03397. This document discloses formulations of cyclic methyl ethyl ketone peroxides in isododecane, pentadecane (bp 270° C.), and Primol® 352. This document, however, does not relate to the problem addressed in the present application, i.e. cyclic ketone peroxide formulations which are safe and have a high active oxygen content. Furthermore, pentadecane is too expensive, isododecane is too volatile, and the use of Primol® 352 presents problems in handling due to the increased viscosity of formulations containing this latter phlegmatizer.

It is noted that WO 93/25615 discloses that a styrene oligomer can be used as phlegmatizer for organic peroxides. There is no disclosure or suggestion of how to use styrene oligomers to make cyclic-ketone peroxide compositions with a high active oxygen concentration.

It is also noted that FR 862974, published in 1941, discloses formulations of acetone peroxide and butanone, i.e. methyl ethyl ketone, peroxide in gas oil. FR 862974 does not relate to the technical problem of the instant application either. Moreover, formulations of cyclic ketone peroxides in petroleum fractions like gas oil are unattractive for use in polymerization and polymer modification processes in view of the fact that they contain aromatic compounds which will remain in the polymer end product upon use of such a formulation, causing adverse taste, smell, and colour. Furthermore, it will be difficult, if not impossible, to obtain the required approval for their use in food-grade polymer production.

It has unexpectedly been found that the use of phlegmatizers with a specific boiling point permits the formulation of safe cyclic ketone peroxide compositions having a high active oxygen content and meeting all of the other above-mentioned requirements at an economically attractive cost price.

The composition according to the present invention is characterized in that the phlegmatizer has a 95% boil-off point falling in the range of from 220 to 265° C.

In the instant application, by 95% boil-off point is meant the boiling point (bp) at which 95% by weight of the phlegmatizer is boiled off, or in the case of a single solvent compound, such as tetradecane, the boiling point of this compound. Typically the 95% boil-off point is obtained from conventional analytical methods like ASTM-D5399. For example, for mixtures of compounds obtained via fractional distillation of petroleum a 95% boil-off point is frequently reported in the product data sheet. Such mixtures are commercially available from various sources at a relatively low cost price. For example, Isopar® M having a boiling point range of 208–254° C. and a 95% boil-off point of 245° C. can be purchased from Exxon. Preferably, the 95% boil-off point lies in the range of from 220 to 260° C., more preferably from 225 to 255° C., most preferably from 235 to 250° C. Either a single phlegmatizer or a mixture of phlegmatizers can be used in the composition of the present invention, as long as the single phlegmatizer or the mixture of phlegmatizers fulfills the 95% boil-off point requirement of claim 1. Preferably, a single phlegmatizer is used. If a mixture of phlegmatizers is used, the difference between the boiling points should be less than 20° C., with the median of a boiling point range being taken in the case of a phlegmatizer consisting of a mixture of compounds.

Examples of phlegmatizers which are suitable for use in the composition according to the present invention include linear and branched hydrocarbon solvents such as tetradecane, tridecane, Isopar® M, Exxsol® D80, Exxsol® D100, Exxsol® D100S, Soltrol® 145, Soltrol® 170, Varsol® 80, Varsol® 110, Shellsol® D100, Shellsol® D70, Halpasol® i 235/265, and mixtures thereof. Particularly preferred phlegmatizers are Isopar® M and Soltrol® 170. Although less preferred, it is also possible to use a specific fraction of the styrene oligomers of WO 93/25615.

Typically, the cyclic ketone peroxide composition according to the present invention is liquid at room temperature, with the peroxide completely dissolved in the phlegmatizer of choice.

The compositions of the present invention, unlike compositions of the same cyclic ketone peroxide with the same active oxygen content in which use is made of a phlegmatizer not satisfying the 95% boil-off point requirement as specified herein, are safe. In this specification, by "safe" is meant that the compositions of the present invention pass the following tests:

the Deflagration test (deflagration),
the Time Pressure test (deflagration),
the Koenen test (heating under defined confinement),
the Pressure Vessel test (heating under defined confinement), and
the Thermal Explosion Vessel test (heating under defined confinement).

Passing these tests means a "medium" or "low" rating in the heating under defined confinement tests and a "no" or "yes, slowly" rating in the deflagration tests. The final hazard rating, for which the most severe rating in any one of the tests is used, must be "medium" or "low."

The safety tests and corresponding criteria are documented in the "United Nations Recommendations on the Transport of Dangerous Goods, Manual of Tests and Criteria," as explained below in the section "Examples."

Typically, the cyclic ketone peroxides that can be formulated in accordance with the present invention are represented by the formulae I–III:

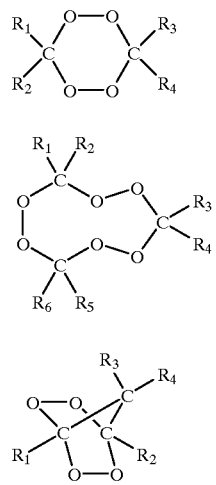

wherein $R^1$–$R^6$ are independently selected from the group consisting of hydrogen, $C_1$–$C_{20}$ alkyl, $C_3$–$C_{20}$ cycloalkyl, $C_6$–$C_{20}$ aryl, $C_7$–$C_{20}$ aralkyl, and $C_7$–$C_{20}$ alkaryl, which groups may include linear or branched alkyl moieties; and each of $R^1$–$R^6$ may optionally be substituted with one or more groups selected from hydroxy, alkoxy, linear or branched alkyl, aryloxy, ester, carboxy, nitrile, and amido.

Preferably, the cyclic ketone peroxides to be incorporated into the composition of the invention consist of oxygen, carbon, and hydrogen atoms. More preferably, the cyclic ketone peroxide is derived from linear, branched or cyclic $C_3$–$C_{13}$, most preferably $C_3$–$C_7$, ketones or $C_4$–$C_{20}$, most preferably $C_4$–$C_7$, diketones. The use of ketones leads to the formation of the cyclic ketone peroxides of formulae I and 11 and the use of diketones to those of formula III.

Examples of suitable cyclic ketone peroxides for use in accordance with the present invention include the peroxides derived from acetone, acetyl acetone, methyl ethyl ketone, methyl propyl ketone, methyl isopropyl ketone, methyl butyl ketone, methyl isobutyl ketone, methyl amyl ketone, methyl isoamyl ketone, methyl hexyl ketone, methyl heptyl ketone, diethyl ketone, ethyl propyl ketone, ethyl amyl ketone, methyl octyl ketone, methyl nonyl ketone, cyclopentanone, cyclohexanone, 2-methylcyclohexanone, 3,3,5-trimethyl cyclohexanone, and mixtures thereof.

Cyclic ketone peroxides can be produced as described in WO 96/03397.

Preferably, the composition according to the present invention comprises cyclic ketone peroxides of the formulae I and II, more preferably predominantly of formula II. The peroxides according to formula I are also referred to as dimers and those according to formula II as trimers. These dimeric and trimeric structures can be formed starting from a single ketone or from a mixture of ketones. Preferably, a single ketone is used. Alternatively, the invention composition comprises predominantly cyclic ketone peroxides according to formula III.

Typically, the invention composition comprises a cyclic ketone peroxide having a trimer/dimer weight ratio of from 60:40 to 99.99:0.01, calculated on the total weight of peroxide. Preferably, this ratio is from 80:20 to 99.95:0.05, more preferably from 85:15 to 99.9:0.1, and most preferably from 93:7 to 99.9:0.1.

The composition of the present invention can be prepared by producing the cyclic ketone peroxide in the phlegmatizer according to the invention or after its preparation the cyclic ketone peroxide can be dissolved in the phlegmatizer of choice. Preferably, the cyclic ketone peroxide is manufactured directly in the phlegmatizer in accordance with the present invention. The manufacture of a composition having a high active oxygen content is advantageous with respect to an efficient use of the reactor and the reagents. The invention composition may be further diluted with the phlegmatizer of choice in order to comply with regulations for storage and transport, in particular in the case of bulk quantities, which are stored and transported in intermediate bulk containers and tanks.

When cyclic ketone peroxides are prepared starting from a suitable ketone, usually a mixture of peroxides is formed which predominantly consists of the trimeric and dimeric forms. However, the compositions may also comprise some linear as well as some tetrameric and higher oligomeric cyclic structures. Preferably, the cyclic ketone peroxide consists essentially of trimer and dimer in amounts as defined above.

The ratio between the various forms, notably the trimer/dimer ratio, mainly depends on the reaction conditions during the preparation, and the person skilled in the art is referred to WO 96/03397 for obvious variations in the reaction conditions that can be carried out in order to influence this ratio. If so desired, the reaction mixture may be separated into the individual cyclic ketone peroxide compounds. However, in order to avoid laborious purification procedures, the composition of the invention will typically contain some dimeric structures next to trimeric ones, as defined earlier. Preference for certain compositions or individual compounds may depend on differences in physical properties or requirements in the application of the peroxides, e.g. storage stability, half-life time versus temperature, volatility, boiling point, solubility, etc.

The composition of the present invention may optionally contain certain additives as long as these additives do not have a significant negative effect on the safety, transportability and/or storage stability of the formulation. As examples of such additives may be mentioned: antiozonants, antioxidants, antidegradants, U.V. stabilizers, coagents, fungicides, antistatic agents, pigments, dyes, coupling agents, dispersing aids, blowing agents, lubricants, process oils, and mould-release agents. These additives may be employed in their usual amounts. Normally, such additives will be added to the phlegmatized cyclic ketone peroxide formulation in accordance with the present invention shortly before the formulation is used in a polymerization or polymer modification process.

Preferably, the composition in accordance with the present invention consists essentially of cyclic ketone peroxide and phlegmatizer. Preferably, the composition contains 5–95% by weight, more preferably 20–70% by weight, and most preferably 30–50% by weight, of cyclic ketone peroxide, based on the total weight of the composition, with the remainder being phlegmatizer.

Preferably, the invention composition has an active oxygen content of greater than 6, more preferably greater than 7 weight percent. For storing and transporting bulk quantities of the invention composition it may be necessary to dilute the composition with the phlegmatizer of choice thereby reducing the active oxygen content of the cyclic ketone peroxide composition from about 6 to 8 to about 3 to 4 weight percent.

The present invention also relates to the use of these compositions in radical (co)polymerization processes, polymer modification processes such as controlled rheology polypropylene processing, and other reactions involving peroxides, like the synthesis of certain chemicals. By applying the cyclic ketone peroxide formulations according to the present invention, less phlegmatizer is introduced into the various applications, either allowing higher peroxide loads in the process or generating polymeric products with improved properties and containing fewer impurities derived from the phlegmatizer used.

The present invention is illustrated by the following examples.

EXAMPLES

In all examples the compositions contain cyclic Methyl Ethyl Ketone Peroxide (cyclic-MEKP). A cyclic-MEKP composition is obtainable by first mixing 28.8 g of methylethyl ketone, a certain amount of phlegmatizer, and 14.0 g of a 70% aqueous solution of sulfuric acid, at a temperature of 40° C., and subsequently adding 19.4 g of a 70% aqueous solution of hydrogen peroxide over a period of 15 minutes. After a postreaction time of 270 minutes at 40°C., the organic layer was separated, neutralized with 12.5 g of a 6% aqueous solution of sodium bicarbonate, dried with 1.0 g of magnesium sulfate dihydrate, and filtered

| Phlegmatizer/solvent: | 95% boil-off or boiling point (° C.): |
|---|---|
| Isododecane | 185 |
| Soltrol ® 170 (ex Phillips Petroleum) | 240 |
| Isopar ® M (ex Exxon) | 245 |
| Marcol ® 52 (ex Exxon) | 393 |
| Primol ® 352 white oil (ex Exxon) | 477 |

The total active oxygen content of cyclic ketone peroxide compositions was determined by placing 50 ml of glacial acetic acid in a 250 ml round-bottomed flask fitted with a ground glass joint, an inlet tube for nitrogen gas, a heating mantle, and a 70 cm long air condenser. Nitrogen gas was then passed over the liquid with heating until the liquid boiled. After 2 minutes of boiling, 5 ml of 770 g/l potassium iodide solution was added, and a sample containing approximately 2 meq of active oxygen was added to the reaction mixture with mixing. The air condenser was then connected, and the contents of the flask are heated rapidly to boiling and maintained at moderate boiling for 30 minutes. 50 ml of water was then added through the condenser to rinse it, after which the condenser was removed from the flask. The reaction mixture was immediately titrated with a 0.1 N sodium thiosulfate solution until the yellow colour disappeared. A blank should be run alongside this titration. The total active oxygen can then be calculated by subtracting the volume of sodium thiosulfate solution used in the blank from the amount used in the titration, multiplying this figure by the normality of the sodium thiosulfate solution and then by 800, and finally dividing by the mass of the peroxide sample in milligrams.

The active oxygen content of the non-cyclic peroxides used was measured by placing 20 ml of glacial acetic acid in a 200 ml round-bottomed flask fitted with a ground glass joint and an inlet tube for nitrogen gas. Nitrogen gas was then passed over the surface of the liquid. After 2 minutes, 4 ml of 770 g/l potassium iodide solution was added, and a sample containing approximately 1.5 meq of active oxygen was added to the reaction mixture with mixing. The reaction mixture was allowed to stand for at least 1 minute at 25° C. at 5° C. The reaction mixture was then titrated with a 0.1 N sodium thiosulfate solution to colourless end point, with 3 ml of 5 g/l starch solution being end towards the end of the titration. A blank should be run alongside this titration. Non-cyclic active oxygen can be calculated as indicated above. The amount of cyclic ketone peroxide active oxygen equals the total amount of active oxygen minus the non-cyclic active oxygen.

Procedures and criteria in respect of the Time Pressure test, the Deflagration test, the Koenen test, the Pressure Vessel test, and the Thermal Explosion Vessel test are described in UN test C.1, UN test C.2, UN test E.1, UN test E.2, and UN test E.4, respectively, in "United Nations Recommendations on the Transport of Dangerous Goods, Manual of Tests and Criteria, ST/SG/AC.10/11/Rev.1," United Nations, New York and Geneva, 1990.

The results depicted in Table 1 show that the formulations according to the present invention, i.e. Examples 1–2, have the required safety properties, i.e. a final hazard rating of "medium" and a high active oxygen content of 7.5 weight percent in Example 2, whereas the formulations which do not satisfy the 95% boil-off point range as specified herein, i.e. Comparative Examples A–C, do not have the required safety properties at an active oxygen content of 6 weight percent.

TABLE 1

Examples 1–2 and Comparative Examples A–C
Hazard rating of phlegmatized cyclic-MEKP formulations

| Example | Active O content (%) | Phlegmatizer | Pressure Vessel test, rating | Koenen test, rating | Thermal Explosion Vessel test, rating | Deflagration test (mm/s), rating | Time Pressure test (ms), rating | Final hazard rating**) |
|---|---|---|---|---|---|---|---|---|
| 1 | 9 | Soltrol ® 170 | >9 mm, violent | — | — | — | — | = violent |
|  | 8 |  | 1.5 mm. low | 1.5 mm, medium | 189 MPa²/s, violent | 0.329, no | 430, yes slowly | = violent |

TABLE 1-continued

Examples 1–2 and Comparative Examples A–C
Hazard rating of phlegmatized cyclic-MEKP formulations

| Example | Active O content (%) | Phlegmatizer | Pressure Vessel test, rating | Koenen test, rating | Thermal Explosion Vessel test, rating | Deflagration test (mm/s), rating | Time Pressure test (ms), rating | Final hazard rating** |
|---|---|---|---|---|---|---|---|---|
| | 6 | | 1 mm, low | 1 mm, low | 13.8 MPa$^2$/s, medium | 0.045, no | <20.7 bar, no | = medium |
| 2 | 8 | Isopar ® M | 3.0, low | 2 mm, violent | 157 MPa$^2$/s, violent | 0.044, no | 2501, yes slowly | = violent |
| | 7.5 | | 2.0, low | 1.5 mm, medium | 3.3 MPa$^2$/s, low | — | — | = medium |
| A | 7 | Isododecane | >9 mm, violent | — | violent*) | — | — | = violent |
| | 6 | | 14 mm, violent | <1 mm, low | violent*) | 0.02, no | <20.7 bar, no | = violent |
| | 5 | | >9 mm, violent | — | violent*) | — | — | = violent |
| B | 6 | Marcol ® 52 | 3.0, low | <1 mm, low | violent*) | 0.122, no | — | = violent |
| C | 8 | Primol ® 352 | >9 mm, violent | — | — | — | — | = violent |
| | 7 | | ≦9 mm, violent | ≧2 mm, violent | violent*) | — | — | = violent |
| | 6 | | 8 mm, medium | <1 mm, low | violent*) | 3.89, yes slowly | <20.7 bar. no | = violent |
| | 5 | | — | — | violent*) | — | — | = violent |

*)The pressure rise is too fast to be detected by pressure transducer; the inside glass cup is fragmented, which is judged "violent."
**)The most severe rating of any one of the tests at that active oxygen content is shown.

What is claimed is:

1. A composition comprising cyclic ketone peroxide and phlegmatizer, wherein the phlegmatizer has a 95% boil-off point falling in the range of from 220 to 265° C.

2. The composition of claim 1 wherein the 95% boil-off point range is in the range of from 235 to 250° C.

3. The composition of claim 1 wherein the cyclic ketone peroxide is cyclic methyl ethyl ketone peroxide having a trimer:dimer weight ratio of from 93:7 to 99.9:0.1, calculated on the total weight of peroxide.

4. The composition of claim 1 wherein the composition contains 20–70% by weight of cyclic ketone peroxide, calculated on the total weight of the composition.

5. The composition of claim 1 wherein the total active oxygen content is greater than 6 calculated on the total weight of the composition.

6. The composition of claim 1 wherein the composition contains 30–50% by weight of cyclic ketone peroxide, calculated on the total weight of the composition.

7. The composition of claim 1 wherein the total active oxygen content is greater than 7 calculated on the total weight of the composition.

8. The composition of claim 1 wherein the composition comprises a single phlegmatizer.

9. The composition of claim 8 wherein the phlegmatizer is a hydrocarbon solvent.

10. A (co) polymerization process which comprises adding a composition comprising cyclic ketone peroxide and phlegmatizer to unsaturated monomers, wherein said phlegmatizer has a 95% boil-off point falling in the range of from 220 to 265° C.

11. A polymer modification process which comprises contacting a composition comprising cyclic ketone peroxide and phlegmatizer with the polymer, wherein said phlegmatizer has a 95% boil-off point falling in the range of from 220 to 265° C.

* * * * *